United States Patent [19]

Chiu

[11] Patent Number: 5,155,316
[45] Date of Patent: Oct. 13, 1992

[54] HEAT-CONDUCTING MAT FOR ABSORBING MICROWAVE AND ELECTROMAGNETIC WAVE ENERGY

[76] Inventor: Sou-Kuein Chiu, No. 117 Sec. 1, Nei Hu Rd., Taipei City, Taiwan

[21] Appl. No.: 633,113

[22] Filed: Dec. 24, 1990

[51] Int. Cl.⁵ .......................... H05B 6/12; H05B 6/80
[52] U.S. Cl. .................. 219/10.491; 219/10.55 E; 219/10.55 F; 174/35 MS; 428/244
[58] Field of Search .................. 219/10.55 E, 10.55 F, 219/10.55 R, 10.491, 10.493, 10.75; 174/35 MS; 99/DIG. 14, 451; 342/1; 428/242, 244

[56] References Cited

U.S. PATENT DOCUMENTS

| | | | |
|---|---|---|---|
| 4,210,124 | 7/1980 | Husslein et al. | 219/10.55 E |
| 4,933,193 | 6/1990 | Fisher | 426/107 |
| 4,977,302 | 12/1990 | Merigaud et al. | 219/10.55 F |
| 5,002,826 | 3/1991 | Pollart et al. | 428/323 |
| 5,075,526 | 12/1991 | Sklenak et al. | 219/10.55 E |

*Primary Examiner*—Philip H. Leung

[57] ABSTRACT

A heat-conducting mat for absorbing microwave and electromagnetic wave energy comprising: a basic metal material selected from the group including bronze, silver and soft iron, the basic metal material being pressed to form a piece of mat and capable to be rolled up; and a heat-conducting film being coated on the basic metal material; wherein the heat-conducting film comprising a heat-collecting coat comprising a first paste-like mixture of iron oxide powder, ruthenium, glass powder and medium; an electromagnetic wave energy absorbing coat comprising a second paste-like mixture of creaming gold, silver powder and the medium, the electromagnetic wave energy absorbing being printed and coated on the heat-collecting coat; and a protecting coat comprising a third paste-like mixture of iron oxide powder and glass powder, the protecting coat being coated on the electromagnetic wave energy absorbing coat so as to protect the basic metal material from generating static electricity or sparks. So that the piece of mat can be used for a microwave oven and an electromagnetic wave oven.

1 Claim, 3 Drawing Sheets

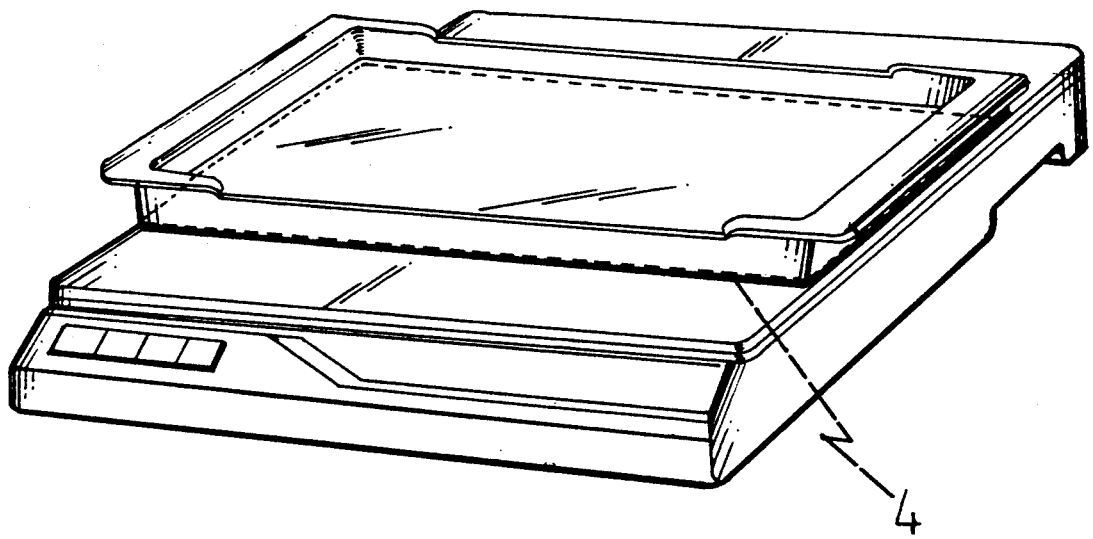
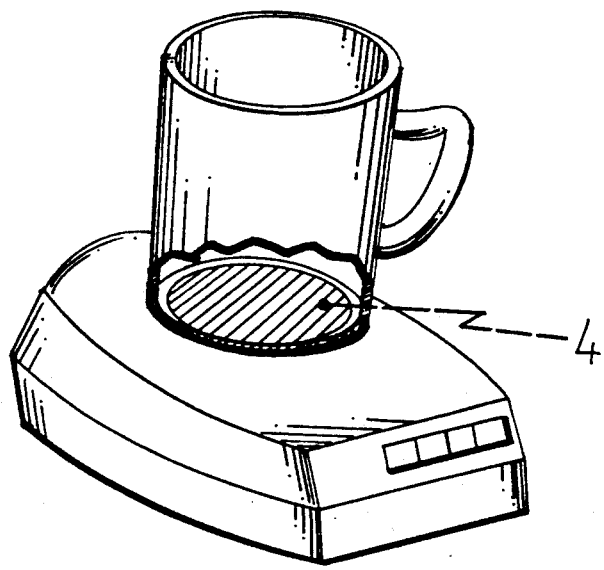

HEAT-CONDUCTING MAT FOR ABSORBING MICROWAVE AND ELECTROMAGNETIC WAVE ENERGY

BACKGROUND OF THE INVENTION

1. Field of the Invention

This invention relates to a heat-conducting mat, particularly to a mat made of metal which has good extensibility and coated by a heat-conducting film which has good absorptivity for microwave and electromagnetic wave energy.

2. Description of the Prior Art

A conventional utensil used for a microwave oven is made of glass, ceramic, or plastics, but this type of utensil can not be used for an electromagnetic induction. Moreover, a conventional utensil used for an electromagnetic wave oven is made of steel, but it can not be used for a microwave oven because it will have static sparks which may cause great danger. It is very unsatisfactory for the users to use the conventional types of utensils without coating on a heat-conducting mat for absorbing wave energy and changing wave energy into heat energy.

SUMMARY OF THE INVENTION

A heat-conducting mat for absorbing microwave and electromagnetic wave energy consists of a basic metal material made of bronze, or silver, or soft iron which can be easily rolled up, and a heat-conducting film. Said film is comprised of a heat-collecting coat, an electromagnetic wave energy absorbing coat, and a protecting coat. The heat-collecting coat is composed of Ruthenium, Iron Oxide powder, glass powder, and Medium Oil. These materials are mixed up and milled by a ball miller for five hours to become a paste-like mixture in which they are proportionally dispersed and whose coefficient is thereof adjusted to maintain the same.

Said mixture can be pasted and coated on the surface of said basic metal material. After the coated mixture is dried by a drying machine, it can be burned on the basic metal material by a fire at a temperature of 850° C. so as to become a heat-collecting coat whose thickness is 0.03 mm and whose density is 0.005 g/cm2.

Said Medium Oil is comprised of Aromatic Solvent (53%), Synthetic Material (30%), Tetrahydro Naphthalene (7%), Mineral Oil (7%), and Resin Oil (3%). The electromagnetic wave energy absorbing coat consists of said Medium Oil (about 55%), glass powder (about 5%), silver powder (about 37%), and creaming gold (about 3%) which is composed of gold (8%), and Resin Oil (92%). These four materials are mixed up to become a paste-like mixture which can be coated on said heat-collecting coat. After the coated mixture is dried, it will become the electromagnetic wave energy absorbing coat whose thickness is 0.09 mm and whose density is 0.02 g/cm2. The gold and silver in this coat are materials good for absorbing wave energy and conducting heat.

The protecting coat is composed of Iron Oxide powder (about 10%) and glass powder (about 90%). The protecting coat can be burned on said wave energy absorbing coat by a fire at a temperature from 800° C. to 850° C. so as to protect said basic metal material from generating static sparks. Thus, the basic metal material can be used either for a microwave or an electromagnetic wave oven.

BRIEF DESCRIPTION OF THE DRAWINGS

FIG. 6 is a view of said tray used on an electromagnetic wave oven.

FIG. 7 is a perspective view of the mat coated on the bottom surface of a cup.

Figure 1:
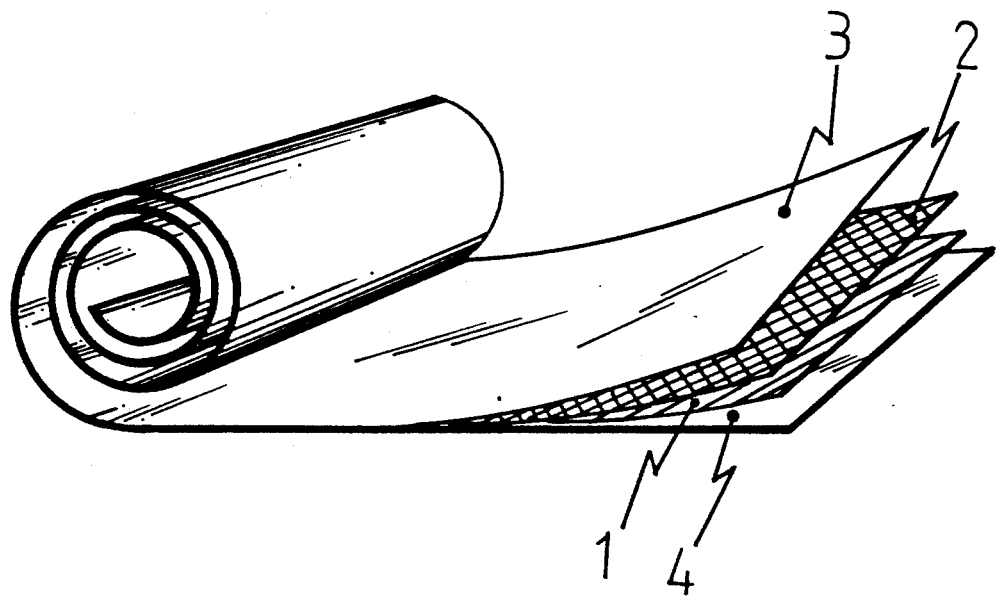
FIG. 1 is a perspective view of a mat partly rolled up and coated by a heat-conducting film according to the invention.

DRAWING REFERENCE NUMERALS 1 heat-collecting coat
2 electromagnetic wave energy absorbing coat
3 protecting coat
4 basic metal material
5 heat-conducting film consists of 1, 2, 3.

DETAILED DESCRIPTION OF THE PREFERRED EMBODIMENT

Figure 3:
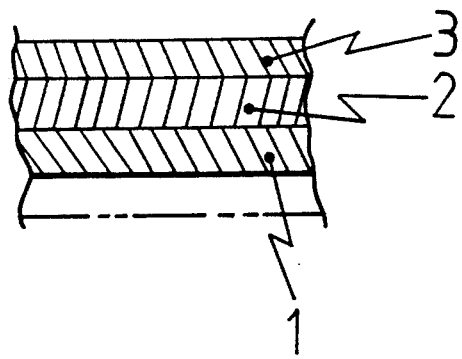
FIG. 3 is a sectional view of the heat-conducting film in absorbing wave energy.
Figure 4:
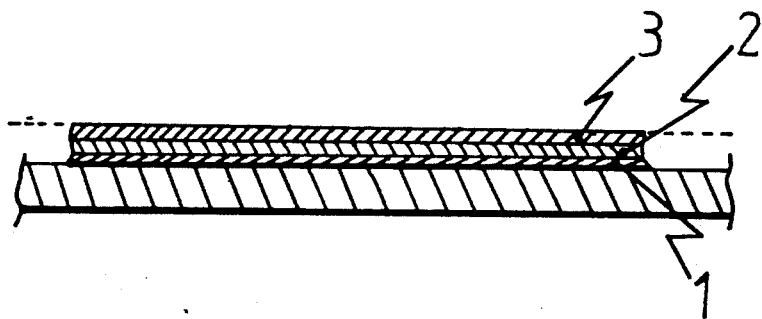
FIG. 4 is a sectional view of the heat-conducting film coated on the surface of a metal according to the invention.

As shown in FIGS. 1 and 4, a heat-conducting mat made of metal materials (4), such as bronze, silver, and soft iron, which have good extensibility. The basic metal materials (4) of the mat have enough extensibility that it can be rolled up to save space. It is pressed and rolled so that its thickness can be less than 0.5 mm. Its surface is coated by a heat-conducting film (5) which consists of a heat-collecting coat (1), an electromagnetic wave absorbing coat (2), and protecting coat (3) (see also FIGS. 2, 3). The heat-conducting film (5) can absorb microwave and electromagnetic wave energy and can immediately transform the wave energy into heat energy.

Figure 2:
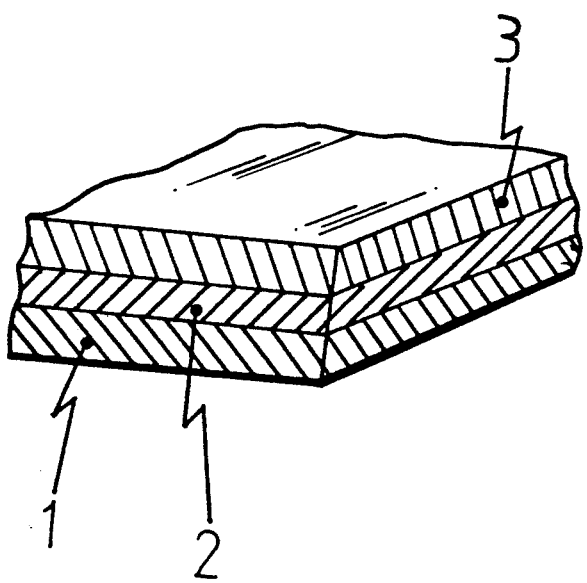
FIG. 2 is a sectional view of the heat-conducting film in accordance to the invention.

As shown in FIGS. 2, and 3, the heat-collecting coat (1) is composed of the following four materials: Iron Oxide powder (4%), Ruthenium (20%), glass powder (24%), and Medium Oil (52%). These four materials can be mixed up and milled by a ball miller for five hours to become a paste-like mixture in which they are proportionally dispersed and whose coefficient is justified to become the same. The mixture can be printed and coated on the surface of a fine ceramic or glass utensil. After the mixture is dried by a drying machine, it can be burned on the utensil by a fire at a high temperature of 850° C. to become the heat-collecting coat (1) whose thickness is 0.03 mm and whose density is 0.005 g/cm2.

Said Iron Oxide powder is made from Iron powder. Pure Iron powder can be burned and forged by a fire at a high temperature from 500° C. to 600° C. so as to become Iron Oxide powder which has a good heat conductivity.

The electromagnetic wave energy absorbing coat (2) is composed of glass powder (5%), said Medium Oil (55%), silver powder (37%), and creaming gold (3%) which consists of gold (8%) and resin Oil (92%). These six materials can be mixed up to become a paste-like mixture which can be printed and coated on said heat-collecting coat (1). After coated mixtured is dried, it can be burned on the heat-collecting coat (1) by a fire at a high temperature of 850° C. to become a electromagnetic wave energy absorbing coat (2) whose thickness is 0.09 mm and whose density is 0.02 g/cm2.

The protecting coat (3) is composed of Iron Oxide (10%) and glass powder (90%). The protecting coat (3) is burned on the electromagnetic wave energy absorbing coat (2) by a fire at the temperature of 850° C.

After each coat (1, 2, 3) is burned on the surface of the basic metal material, the heat-conducting film (5) has to be burned on it for a second time to ensure the securing of the coating.

Figure 5:
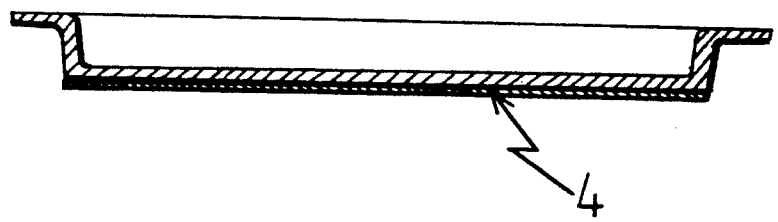
FIG. 5 is a perspective view of the mat coated on the bottom surface of a fine ceramic tray for an electromagnetic wave oven.

As shown in FIGS. 5 and 6, the basic metal material (4) with the heat-conducting film (5) is coated on the bottom surface of a fine ceramic tray used for an electromagnetic wave oven.

As shown in FIG. 7, the basic metal material (4) is coated on the bottom surface of a cup used for an electromagnetic wave oven.

What is claimed is:

1. A heat-conducting mat for absorbing microwave and electromagnetic wave energy comprising:

a basic metal material selected from the group including bronze, silver and soft iron, said basic metal material being pressed to form a piece of mat having a thickness of 0.5 mm and capable to be rolled up; and a heat-conducting film being coated on said basic metal material;

wherein said heat-conducting film comprising a heat-collecting coat comprising a first paste-like mixture of about 4% iron oxide powder, about 20% ruthenium, about 24% glass powder and about 52% medium, wherein said medium mainly including 53% aromatic solvent and 30% synthetic material; said heat-collecting coat having a thickness of 0.03 mm and a density of 0.005 g/cm$^2$; an electromagnetic wave energy absorbing coat comprising a second paste-like mixture of about 8% creaming gold, silver powder and about 55% said medium, said electromagnetic wave energy absorbing coat having a thickness of 0.09 mm and a density of 0.02 g/cm$^2$ and being printed and coated on said heat-collecting coat; and a protecting coat comprising a third paste-like mixture of about 10% iron oxide powder and about 90% glass powder, said protecting coat being coated on said electromagnetic wave energy absorbing coat so as to protect said basic metal material from generating static electricity or sparks.

* * * * *